United States Patent
Green et al.

(10) Patent No.: US 10,430,307 B2
(45) Date of Patent: Oct. 1, 2019

(54) IN-LINE ANNOUNCEMENT OF IMPENDING CRITICAL EVENTS WITHIN A DISTRIBUTED STORAGE ENVIRONMENT

(71) Applicant: International Business Machines Corporation, Armonk, NY (US)

(72) Inventors: Michael Green, Westborough, MA (US); Harry R. McGregor, Tucson, AZ (US); Christopher B. Moore, Vail, AZ (US); Charles B. Theis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 15/424,858

(22) Filed: Feb. 5, 2017

(65) Prior Publication Data
US 2018/0225187 A1    Aug. 9, 2018

(51) Int. Cl.
*G06F 11/00*  (2006.01)
*G06F 11/30*  (2006.01)
*G06F 11/07*  (2006.01)

(52) U.S. Cl.
CPC ...... *G06F 11/3034* (2013.01); *G06F 11/0751* (2013.01); *G06F 11/0793* (2013.01); *G06F 11/3055* (2013.01); *G06F 11/3058* (2013.01)

(58) Field of Classification Search
CPC .................................................. G06F 11/3452
USPC ................... 714/47.3, 42, 43, 44, 54, 56, 48
See application file for complete search history.

(56) References Cited

U.S. PATENT DOCUMENTS

| | | | |
|---|---|---|---|
| 6,651,117 B1 | 11/2003 | Wilson et al. | |
| 7,447,207 B2 | 11/2008 | Shankar | |
| 8,316,276 B2 * | 11/2012 | Aizman | H04L 69/16 714/758 |
| 2005/0066225 A1 * | 3/2005 | Rowan | G06F 11/1435 714/5.11 |
| 2006/0117212 A1 * | 6/2006 | Meyer | G06F 3/0605 714/4.11 |
| 2013/0339604 A1 | 12/2013 | Zuluaga et al. | |

(Continued)

FOREIGN PATENT DOCUMENTS

JP          EP859321 A1    8/1998

OTHER PUBLICATIONS

Worden, D. J., "SCSI: The Specification, Architecture, and Command Set," Storage Networks, Chapter 4, Springer, 2004.

*Primary Examiner* — Dieu Minh T Le
(74) *Attorney, Agent, or Firm* — Nelson and Nelson; Daniel P. Nelson; Alexis V. Nelson (57) ABSTRACT

A method for announcing impending critical events within a distributed storage environment is disclosed. In one embodiment, such a method analyzes, at a storage system, status of various storage system components to predict an impending critical event to occur at the storage system. Predicting the critical event may include calculating an amount of time before occurrence of the impending critical event. The method then communicates, from the storage system to a host system, over an in-band communication channel used to carry I/O traffic between the host system and the storage system, one or more of the impending critical event and the amount of time. This will ideally enable the host system to take mitigating actions before the critical event occurs. A corresponding system and computer program product are also disclosed.

20 Claims, 7 Drawing Sheets

(56) References Cited

U.S. PATENT DOCUMENTS

2014/0289447 A9 * 9/2014 Flynn .................. G06F 9/52
                                                      711/103
2016/0092107 A1  3/2016 Bruner et al.

* cited by examiner

IN-LINE ANNOUNCEMENT OF IMPENDING CRITICAL EVENTS WITHIN A DISTRIBUTED STORAGE ENVIRONMENT

BACKGROUND

Field of the Invention

This invention relates to systems and methods for announcing impending critical events for collaborative data hardening within a distributed storage environment.

Background of the Invention

Traditionally, when critical events occur within an enterprise class storage array, they happen in a vacuum without host systems being informed of what is happening at the storage array. This means that host systems are typically completely unaware of impending issues in a storage array. Currently, the two most common critical events that adversely impact host systems are input power loss and critical over temperature of storage arrays. Historically, it was believed that communication with hosts regarding these issues was neither practical nor possible. In the case of losing input power at the storage array, it was assumed that connected hosts would lose input power as well and thus did not need to take any action. In modern data center environments, this is no longer necessarily the case since it is quite possible for a host system and a storage system to be on completely separate power distribution systems.

In the event of critical over temperature on a storage array, it was typically assumed that data center monitoring and management protocols would already be taking actions to address the over temperature and shut down host systems. If the storage array needed to shut down, the host systems would most likely already be shut down. Experience with modern data centers, however, in which many are unattended "lights out" facilities, has proven that this is not the case and many times a storage array will detect an over temperature condition well before a customer has any idea that the data center is even having cooling problems.

While many third party/external solutions exist for monitoring data center environments, the tight integration between storage arrays and host systems requires a new approach to how this information is communicated. Ideally, this approach will not rely on external monitoring which may or may not detect issues or critical events occurring on storage arrays in time to take mitigating actions. Such an approach is disclosed herein.

SUMMARY

The invention has been developed in response to the present state of the art and, in particular, in response to the problems and needs in the art that have not yet been fully solved by currently available systems and methods. Accordingly, systems and methods are disclosed to announce impending critical events within a distributed storage environment. The features and advantages of the invention will become more fully apparent from the following description and appended claims, or may be learned by practice of the invention as set forth hereinafter.

Consistent with the foregoing, a method for announcing impending critical events within a distributed storage environment is disclosed. In one embodiment, such a method analyzes, at a storage system, status of various storage system components to predict an impending critical event to occur at the storage system. Predicting the critical event may include calculating an amount of time before occurrence of the impending critical event. The method then communicates, from the storage system to a host system, over an in-band communication channel used to carry I/O traffic between the host system and the storage system, one or more of the impending critical event and the amount of time. This will ideally enable the host system to take mitigating actions before the critical event occurs.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
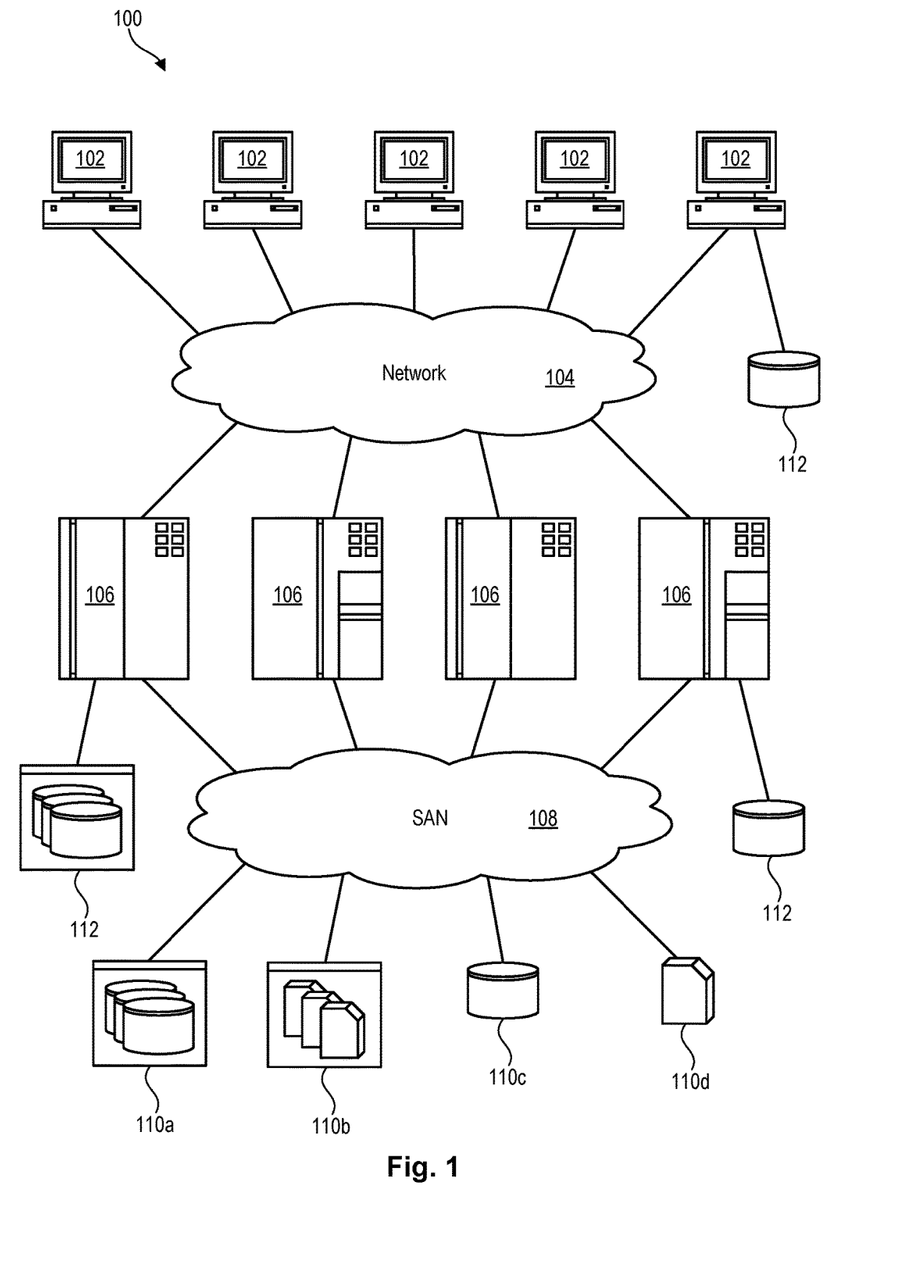
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 communicate using a networking standard such as Fibre Channel (FC).

Figure 2:
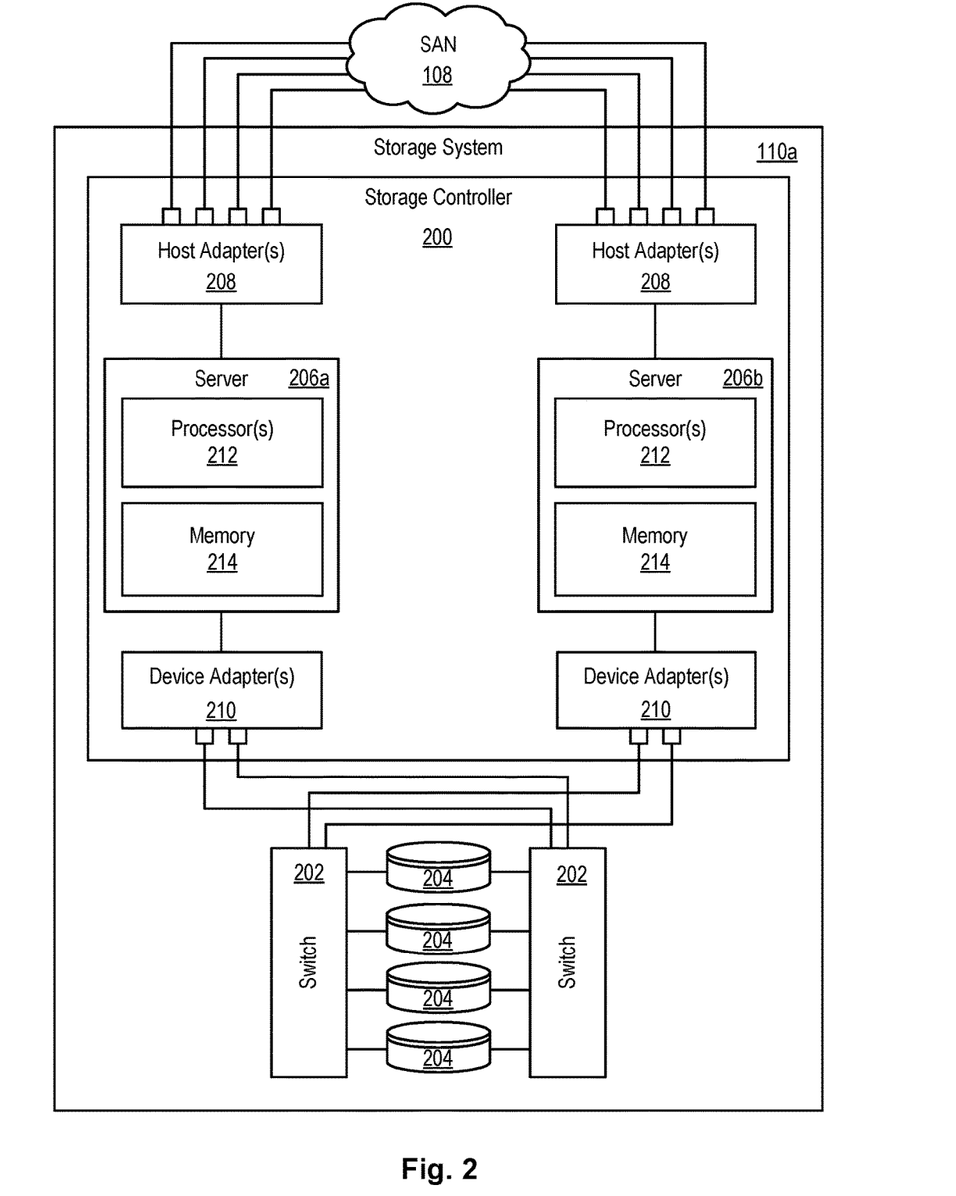
FIG. 2 is a high-level block diagram showing one example of a storage system that may be included in the network environment of FIG. 1.

Referring to FIG. 2, one embodiment of a storage system 110a containing an array of hard-disk drives 204 and/or solid-state drives 204 is illustrated. The internal components of the storage system 110a are shown since certain functionality in accordance with the invention may be implemented within such a storage system 110a. As shown, the storage system 110a includes a storage controller 200, one or more switches 202, and one or more storage drives 204, such as hard disk drives 204 and/or solid-state drives 204 (such as flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
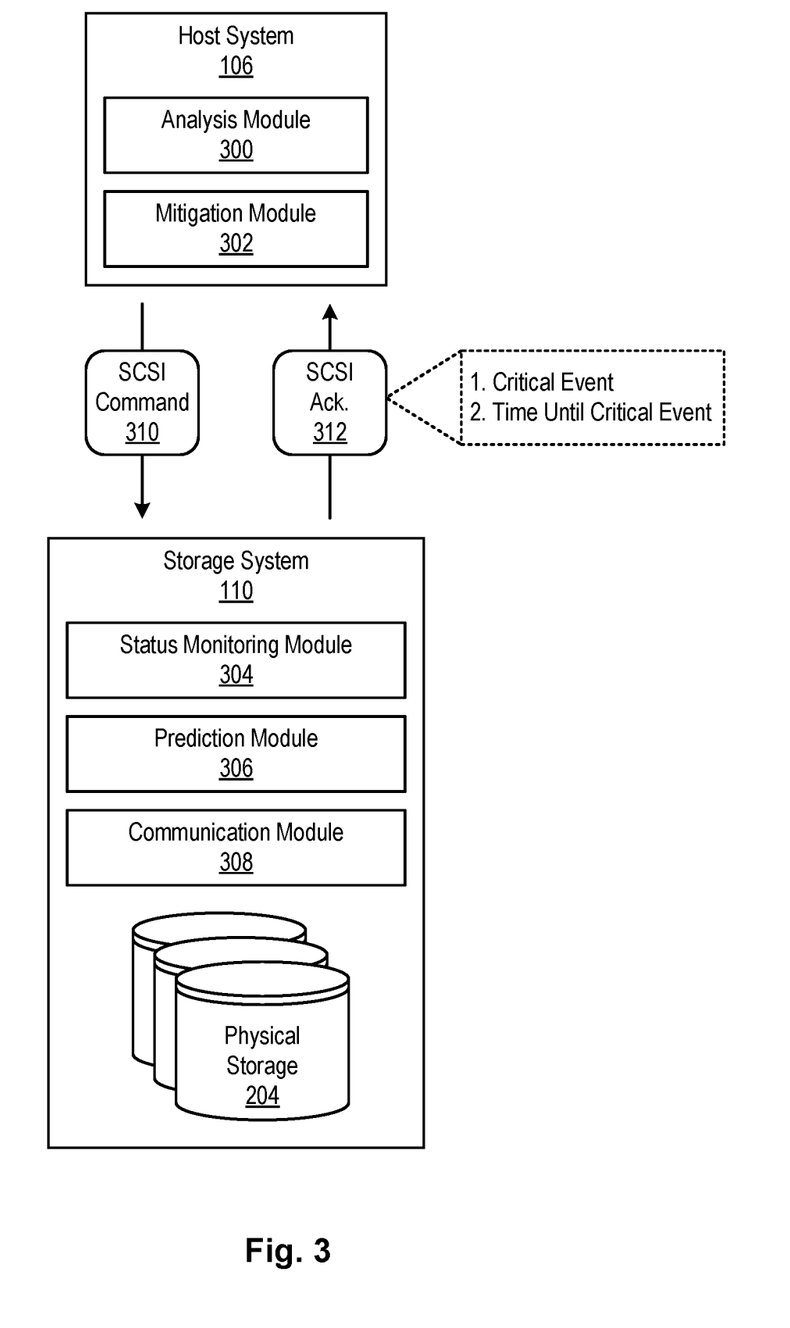
FIG. 3 is a high-level block diagram showing various modules and communications that may be used to implement systems and methods in accordance with the invention.

Referring to FIG. 3, as previously mentioned, traditionally, when critical events occur within a storage system 110 such as that illustrated in FIG. 2, they happen in a vacuum without host systems 106 being informed of what is happening on the storage system 110. This means that host systems 106 are typically completely unaware of impending issues on the storage system 110. Currently, the two most common critical events that adversely impact host systems 106 are input power loss and critical over temperature of connected storage systems 110. Historically, it was believed that communication with host systems 106 regarding these issues was neither practical nor possible. In the case of losing input power at the storage system 110, it was assumed that connected host systems 106 would lose input power as well and thus no action was needed. In modern data center environments, however, this is no longer necessarily the case. In such environments, it is quite possible for a host system 106 and storage system 110 to be on completely separate power distribution systems.

In the event of critical over temperature on a storage system 110, it was typically assumed that data center monitoring and management protocols would already be taking actions to address the over temperature and shut down host systems 106. If a storage system 110 needed to shut down, the host systems 106 would most likely already be shut down. Experience with modern data centers, however, in which many are unattended "lights out" facilities, has proven that this is not the case. In many cases, a storage system 110 will detect an over temperature condition well before a user or data center monitoring tool has any idea that the data center is having cooling problems.

While many third party/external solutions exist for monitoring data center environments, the tight integration between storage systems 110 and host systems 106 requires a new approach to how this information is communicated. Ideally, this approach will not rely on external monitoring which may or may not detect issues or critical events occurring on storage systems 110. One such approach is illustrated in FIG. 3 and disclosed hereinafter.

As shown in FIG. 3, a host system 106 and storage system 110 may be equipped or programmed with various modules to provide various features and functions in accordance with the invention. These modules may be implemented in hardware, software, firmware, or combinations thereof. These modules may include one or more of an analysis module 300, mitigation module 302, status monitoring module 304, prediction module 306, and communication module 308. The modules are presented by way of example and are not intended to represent an exhaustive list of modules that may be used to implement functionality in accordance with the invention. Systems and methods in accordance with the invention may include more or fewer modules than those illustrated, or the functionality of the modules may be organized differently.

As shown, a status monitoring module 304 on the storage system 110 may monitor status of various storage system components. Such status may include power status, temperature status, operational status, or the like of various storage system components, which may include any or all components (internal or external) relied upon by the storage system 110 for operation.

A prediction module 306 in or in association with the storage system 110 may use the status information gathered by the status monitoring module 304 to predict critical events that may occur on or in association with the storage system 110. For example, if temperature of a storage system component is trending upward, the prediction module 306 may predict that a critical over temperature is imminent or on the horizon. Similarly, if input power to the storage system 110 is lost, the prediction module 306 may predict that the storage system 110 will need to shut down (e.g., in the event the storage system 110 is currently running on backup power). In yet other cases, the prediction module 306 may predict that a preferred communication path between the host system 106 and the storage system 110 will go down and become unavailable. Using the status information, including changes in the status information over time, the prediction module 306 may estimate an amount of time it will take for the critical event to occur and potentially make the storage system 110 unavailable.

Once a critical event and/or amount of time associated with the critical event are determined, a communication module 308 may communicate the critical event and/or amount of time to a host system 106 in operable communication with the storage system 110. In certain embodiments, the communication module 308 may utilize an in-band communication channel used to carry I/O traffic between the host system 106 and the storage system 110. Furthermore, the communication module 308 may utilize or piggyback on an existing standard for transferring data between the host system 106 and the storage system 110.

For example, the communication module 308 may in certain embodiments leverage existing optional or vendor-specific data fields or commands within the SCSI specification to actively inform host systems 106 about impending critical events occurring on or in association with the storage system 110. For example, the communication module 308 may utilize the sense field descriptor or a vendor-specific command section within a SCSI header to communicate information. By using the existing SCSI specification, each and every time that a data packet is transmitted between the storage system 110 and the host system 106, the host system 106 may potentially be informed of an impending critical event on the storage system 110, and/or an estimated amount of time before the critical event will occur. Leveraging the SCSI specification enables systems and methods in accordance with the invention to be used on legacy host systems 106 without committing major development resources since the added functionality may be implemented as part of a software component on the legacy system without requiring hardware alterations.

As shown in FIG. 3, SCSI commands 310, such as read, write, or Test Unit Ready commands 310, may be regularly transmitted between a host system 106 and storage system 110 to read or write data, or to determine if a device 106, 110 is ready to receive or transmit data. As further shown in FIG. 3, when a SCSI command 310 is received by the storage system 110, the storage system 110 may return a SCSI acknowledgment 312 to the host system 106. This SCSI acknowledgment 312 may inform the host system 106 that the storage system 110 received or successfully processed the SCSI command 310. Systems and methods in accordance with the invention may, in certain embodiments, embed or provide information within optional data fields (in the header, for example) of the SCSI acknowledgment 312 to inform the host system 106 that a critical event is impending on the storage system 110. In certain embodiments, an estimated amount of time before the critical event occurs may also be provided in the SCSI acknowledgment 312.

Alternatively, the SCSI acknowledgment 312 may simply alert the host system 106 that something on the storage system 110 requires attention (using, for example, an "unit attention" or "check condition" indicator) and the host system 106 may send additional SCSI commands to the storage system 110 to request more details. The storage system 110 may then inform the host system 106 of the impending critical event, the estimated amount of time before occurrence of the critical event, and/or other details associated with the critical event.

Upon receiving a SCSI acknowledgment 312, an analysis module 300 in the host system 106 may analyze the SCSI acknowledgment 312 and any information associated with critical events. This may include analyzing an amount of time until occurrence of the critical event, storage system components that are associated with the critical event, the nature of the critical event, potential problems or data loss that may result from the critical event, and or the like. The mitigation module 302 may then determine mitigating actions to take to mitigate the critical event. Such mitigating actions may include, for example, shutting down the host system 106, hardening data on the host system 106 and/or storage system 110, unmounting volumes on the storage system 110, disabling write caching in the host system 106 (since data in the write cache may have no where to go if the storage system 110 is unavailable), flushing buffers on the host system 106, communicating with the storage system 110 over an alternative path, and/or the like. In certain embodiments, the mitigation module 302 may determine mitigating actions that may be completed before the storage system 110 becomes unavailable. Once appropriate mitigating actions are determined, the mitigation module 302 may take these actions.

In certain embodiments, in cases where the mitigation module 302 may not have time to implement all desired mitigating actions before the critical event occurs, the mitigation module 302 may request additional time from the storage system 110. For example, if a critical event is estimated to occur in thirty seconds, but mitigating actions cannot be completed within that time frame, the mitigation module 302 may transmit a request (e.g., a vendor-specific SCSI command) to the storage system 110 to request that actions (e.g. shut down, etc.) associated with the critical event be delayed beyond the time that they would normally occur. If possible, the storage system 110 will delay these actions to provide time for the host system 106 to perform mitigating actions.

Figure 4:
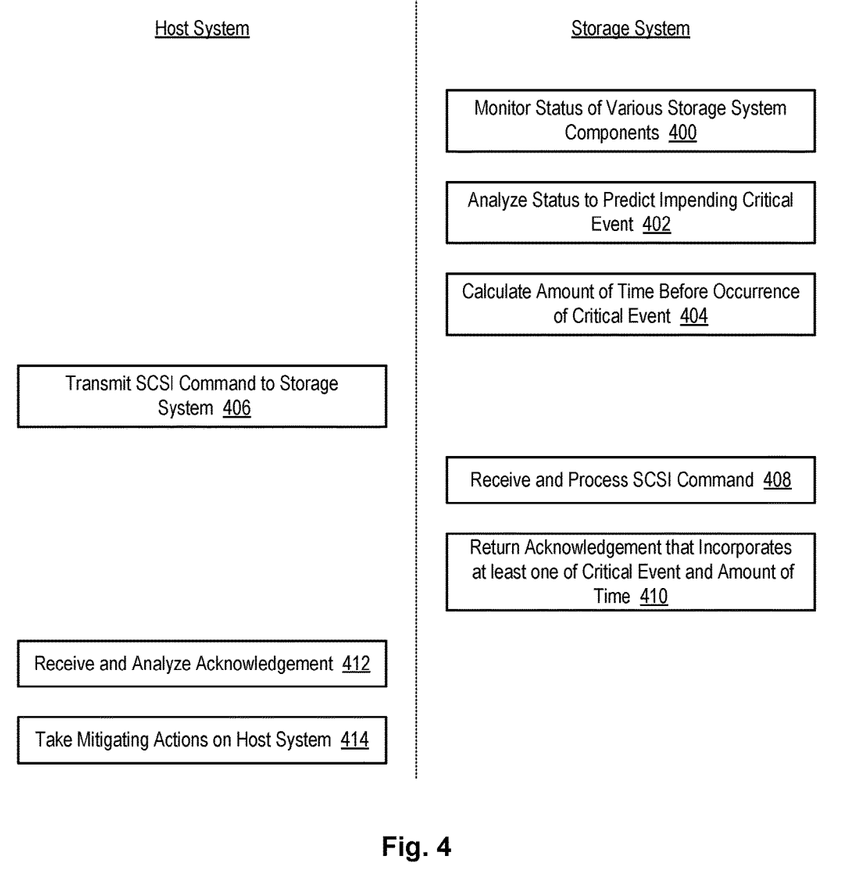
FIG. 4 is a high-level block diagram showing a first scenario of actions and interactions by a host system and storage system.

Referring to FIG. 4, a first scenario of actions and interactions by a host system 106 and storage system 110 is illustrated. As shown, the storage system 110 initially monitors 400 the status of various storage system components. The storage system 110 analyzes 402 the status information to predict a critical event that is impending on the storage system 110. The storage system 110 also calculates 404 an amount of time before occurrence of the critical event.

Meanwhile, the host system 106 transmits 406 a SCSI command 310 to the storage system 110 during the course of normal operations. This SCSI command 310 may be a read, write, or Test Unit Ready command, for example. Upon receiving 408 the SCSI command 310, the storage system 110 processes 408 the command. The storage system 110 then returns 410 a SCSI acknowledgment 312 that acknowledges that the SCSI command 310 was processed. The storage system 110 incorporates 410, into this SCSI acknowledgment 312, information about a critical event impending on the storage system 110 and/or an amount of time before occurrence of the critical event. In certain embodiments, this may be accomplished by embedding the information into optional or vendor-specific data fields of the SCSI acknowledgment 312.

The host system 106 receives 412 the SCSI acknowledgment 312 and analyzes 412 the information in the acknowledgment 312. This will inform the host system 106 of the impending critical event and possibly the amount of time before it occurs. At this point, the host system 106 may take 414 mitigating actions to minimize or reduce affects of the critical event. This may include, for example, shutting down the host system 106, hardening data on the host system 106 and/or storage system 110, unmounting volumes on the storage system 110, disabling write caching in the host system 106, flushing buffers on the host system 106, communicating with the storage system 110 over an alternative path, and/or the like.

Figure 5:
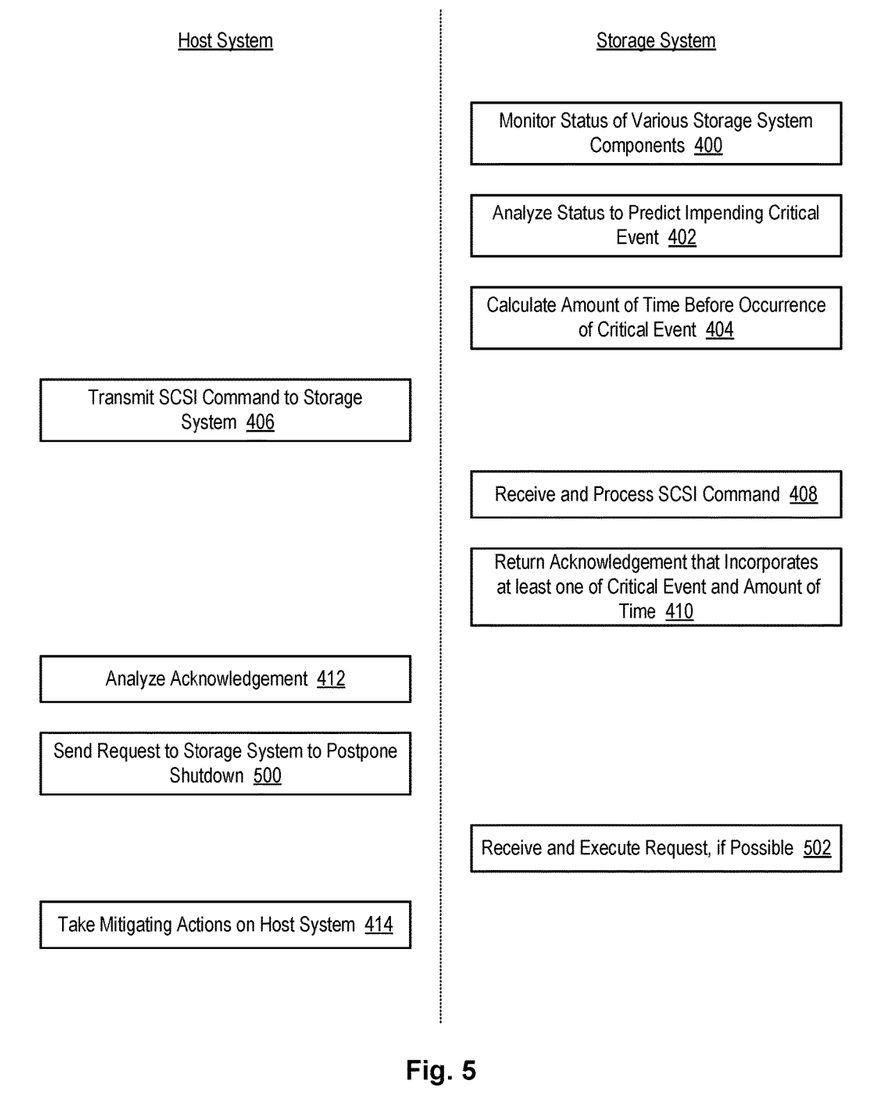
FIG. 5 is a high-level block diagram showing a second scenario of actions and interactions by a host system and storage system.

Referring to FIG. 5, a second scenario of actions and interactions by a host system 106 and storage system 110 is illustrated. This scenario is similar to that illustrated in FIG. 4 (many of the steps are the same), except that the host system 106, upon receiving and analyzing 412 the SCSI acknowledgment 312, determines that additional time may be needed to take desired mitigating actions. Upon making this determination, the host system 106 sends 500 a request to the storage system 110 to postpone a shutdown (of the storage system 110 as a whole or specific storage drives 204 or arrays of storage drives 204 on the storage system 110) so that mitigating actions may be completed. The storage system 110 receives 502 the request and executes 502 the request if possible. The host system 106 takes the desired mitigating actions on the host system 106. The scenario presented in FIG. 5 (as well as the other Figures) enables both the host system 106 and the storage system 110 to be cognizant of situations or conditions on each other in substantially real time. This, in turn, enables the host system 106 and storage system 110 to make intelligent choices as to the best way to mitigate a critical event as quickly as possible.

Figure 6:
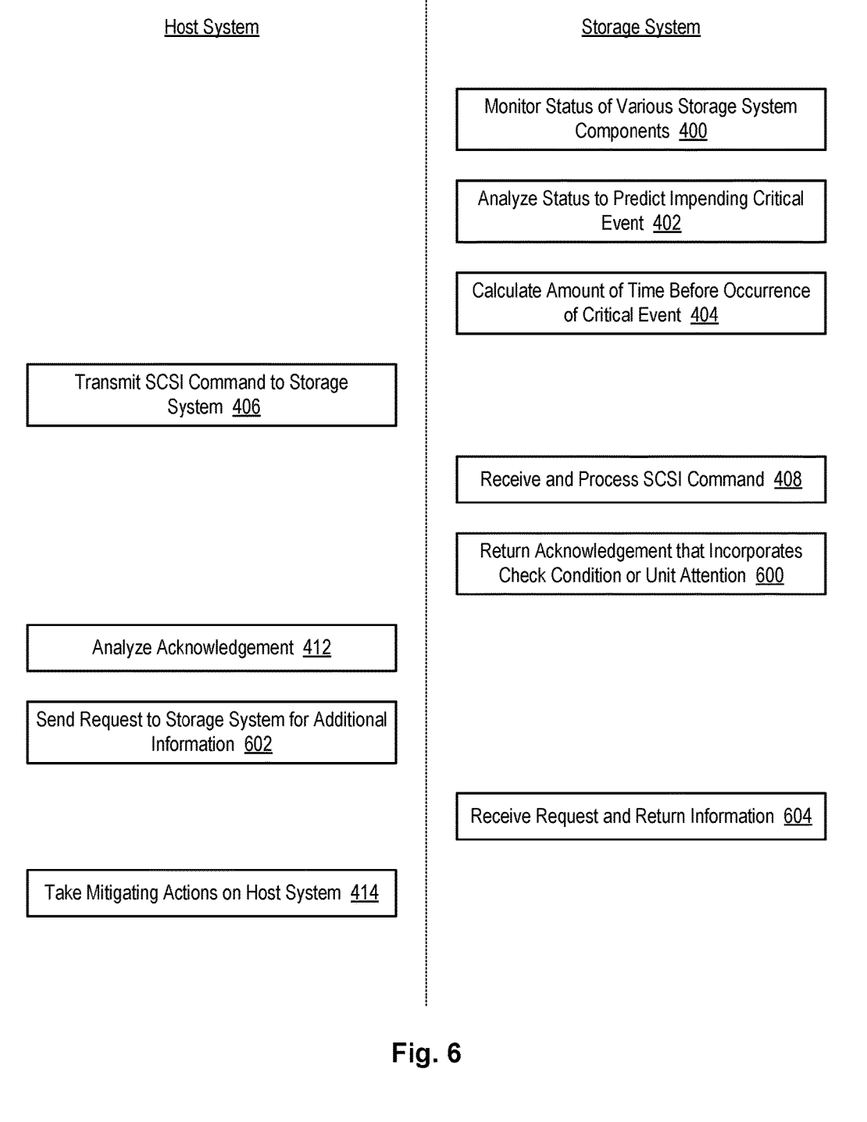
FIG. 6 is a high-level block diagram showing a third scenario of actions and interactions by a host system and storage system.

Referring to FIG. 6, a third scenario of actions and interactions by a host system 106 and storage system 110 is illustrated. This scenario is also similar to that illustrated in FIG. 4, except that the storage system 110 returns 600 a SCSI acknowledgment 312 that incorporates a "check condition" or "unit attention" indicator. Upon receiving the SCSI acknowledgment 312, the host system 106 analyzes 412 the SCSI acknowledgment 312 and detects the "check condition" or "unit attention" indicator. In response, the host system 106 sends 602 a request to the storage system 110 for additional information. The storage system 110 receives 604 this request and returns 604 the desired information to the host system 106. For example, the storage system 110 may inform the host system 106 of an impending critical event and/or an amount of time before occurrence of the critical event. Using this information, the host system 106 may take 414 mitigating actions to minimize or reduce any impact of the critical event.

Figure 7:
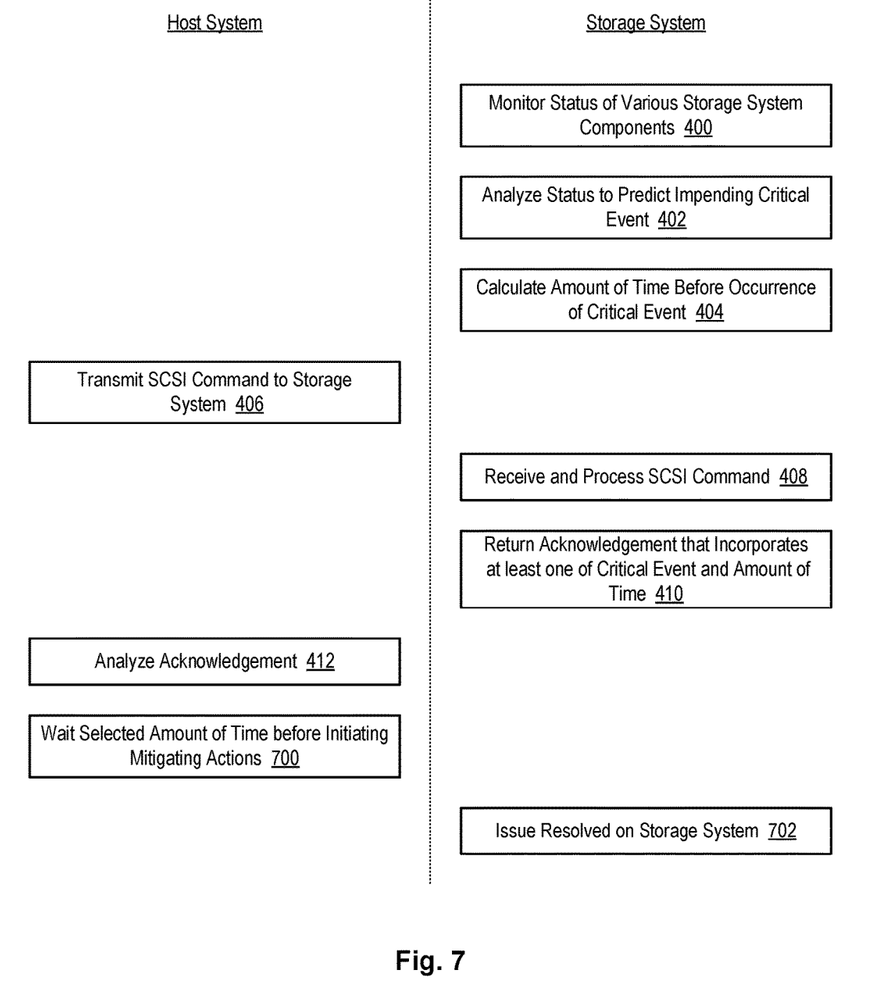
FIG. 7 is a high-level block diagram showing a fourth scenario of actions and interactions by a host system and storage system.

Referring to FIG. 7, a fourth scenario of actions and interactions by a host system 106 and storage system 110 is illustrated. This scenario is also similar to that illustrated in FIG. 4, except for actions performed by the host system 106 after receiving and analyzing 412 the SCSI acknowledgment 312. As shown, after receiving and analyzing 412 a SCSI acknowledgment 312 that indicates that a critical event is impending on the storage system 110, the host system 106 waits 700 for a selected amount of time prior to initiating mitigating actions. The purpose of this wait period is to see if the critical event is resolved on the storage system 110 on its own, which may be indicated in SCSI acknowledgments 312 received by the host system 106 from the storage system 110. In the illustrated scenario, the critical event is resolved 702 on the storage system 110 and the host system 106 performs no further actions. On the other hand, if the critical event is not resolved during the wait period, the host system 106 may initiate mitigating actions and/or request delay of actions on the storage system 110.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for announcing impending critical events within a distributed storage environment, the method comprising:
analyzing, by a storage system, status of various storage system components to predict an impending critical event to occur at the storage system;
calculating, by the storage system, an amount of time before occurrence of the impending critical event; and
communicating, from the storage system to a host system over an in-band communication channel used to carry I/O traffic between the host system and the storage system, at least one of the impending critical event and the amount of time before occurrence of the impending critical event.

2. The method of claim 1, wherein communicating comprises communicating in a SCSI acknowledgment.

3. The method of claim 2, wherein the SCSI acknowledgment is generated in response to a SCSI read or write request received by the storage system.

4. The method of claim 1, wherein the impending critical event is one of a loss of input power to the storage system, a critical over temperature of the storage system, and loss of a communication path between the host system and the storage system.

5. The method of claim 1, further comprising taking, by the host system, mitigating actions in response to the communication from the storage system.

6. The method of claim 5, wherein the mitigating actions comprise at least one of shutting down the host system, hardening data on the host system and/or storage system, unmounting volumes, disabling write caching in the host system, flushing buffers on the host system, and communicating with the storage system over an alternative path.

7. The method of claim 5, wherein the mitigating actions are selected based on a nature of the impending critical event, and the amount of time before occurrence of the critical event.

8. A computer program product to announce impending critical events within a distributed storage environment, the computer program product comprising a computer-readable storage medium having computer-usable program code embodied therein, the computer-usable program code configured to perform the following when executed by at least one processor:
analyze, by a storage system, status of various storage system components to predict an impending critical event to occur at the storage system;

calculate, by the storage system, an amount of time before occurrence of the impending critical event; and communicate, from the storage system to a host system over an in-band communication channel used to carry I/O traffic between the host system and the storage system, at least one of the impending critical event and the amount of time before occurrence of the impending critical event.

9. The computer program product of claim 8, wherein communicating comprises communicating in a SCSI acknowledgment.

10. The computer program product of claim 9, wherein the SCSI acknowledgment is generated in response to a SCSI read or write request received by the storage system.

11. The computer program product of claim 8, wherein the impending critical event is one of a loss of input power to the storage system, a critical over temperature of the storage system, and loss of a communication path between the host system and the storage system.

12. The computer program product of claim 8, wherein the computer-usable program code is further configured to take, on the host system, mitigating actions in response to the communication from the storage system.

13. The computer program product of claim 12, wherein the mitigating actions comprise at least one of shutting down the host system, hardening data on the host system and/or storage system, unmounting volumes, disabling write caching in the host system, flushing buffers on the host system, and communicating with the storage system over an alternative path.

14. The computer program product of claim 12, wherein the mitigating actions are selected based on a nature of the impending critical event, and the amount of time before occurrence of the critical event.

15. A system to announce impending critical events within a distributed storage environment, the system comprising:

at least one processor;

at least one memory device operably coupled to the at least one processor and storing instructions for execution on the at least one processor, the instructions causing the at least one processor to:

analyze, by a storage system, status of various storage system components to predict an impending critical event to occur at the storage system;

calculate, by the storage system, an amount of time before occurrence of the impending critical event; and communicate, from the storage system to a host system over an in-band communication channel used to carry I/O traffic between the host system and the storage system, at least one of the impending critical event and the amount of time before occurrence of the impending critical event.

16. The system of claim 15, wherein communicating comprises communicating in a SCSI acknowledgment.

17. The system of claim 16, wherein the SCSI acknowledgment is generated in response to a SCSI read or write request received by the storage system.

18. The system of claim 15, wherein the impending critical event is one of a loss of input power to the storage system, a critical over temperature of the storage system, and loss of a communication path between the host system and the storage system.

19. The system of claim 15, wherein the instructions further cause the at least one processor to take, on the host system, mitigating actions in response to the communication from the storage system.

20. The system of claim 19, wherein the mitigating actions comprise at least one of shutting down the host system, hardening data on the host system and/or storage system, unmounting volumes, disabling write caching in the host system, flushing buffers on the host system, and communicating with the storage system over an alternative path.

* * * * *